United States Patent [19]
Guibert

[11] 3,888,997
[45] June 10, 1975

[54] METHOD AND APPARATUS FOR PROCESSING DOUGH

[76] Inventor: Raul Guibert, c/o Hotel Shoreham 33 W. 55th St., New York, N.Y. 10019

[22] Filed: May 9, 1973

[21] Appl. No.: 358,483

[52] U.S. Cl. ............... 426/27; 259/191; 426/62; 426/343; 426/504
[51] Int. Cl. ............................................. A21c 1/00
[58] Field of Search ...... 259/191, 192, 193; 426/19, 426/27, 343, 504, 62; 99/90 R

[56] References Cited
UNITED STATES PATENTS

| | | |
|---|---|---|
| 1,790,347 | 1/1931 | Hawkins .................... 259/193 X |
| 2,090,434 | 8/1937 | Thalmann .................. 259/191 |
| 2,765,490 | 10/1956 | Zona ......................... 259/191 |
| 2,896,556 | 7/1959 | Sippel et al. .............. 259/191 |
| 2,997,968 | 8/1961 | Fitzpatrick et al. ......... 259/191 |
| 3,406,643 | 10/1968 | Atkins et al. .............. 259/191 X |
| 3,694,227 | 9/1972 | Vezzani .................... 426/343 X |

FOREIGN PATENTS OR APPLICATIONS
586,579    3/1947    United Kingdom ............. 426/19

Primary Examiner—S. Leon Bashore
Assistant Examiner—Marc L. Caroff

[57] ABSTRACT

A method and apparatus for processing dough for bakery products. Flour and a working solution are intimately admixed by centrifugal action to form a dough which is mechanically worked, extruded, cut into dough balls and formed into shapes ready for baking. The centrifugal action is performed by a high-speed feeder screw which both conveys the flour and solution and admixes them by centrifugal spinning, the same screw having extruding means for discharging the formed dough towards cutting and forming stations. A forming die with a loose membrane on its underside enables the ready separation of the die from the dough-carrying molds.

16 Claims, 15 Drawing Figures

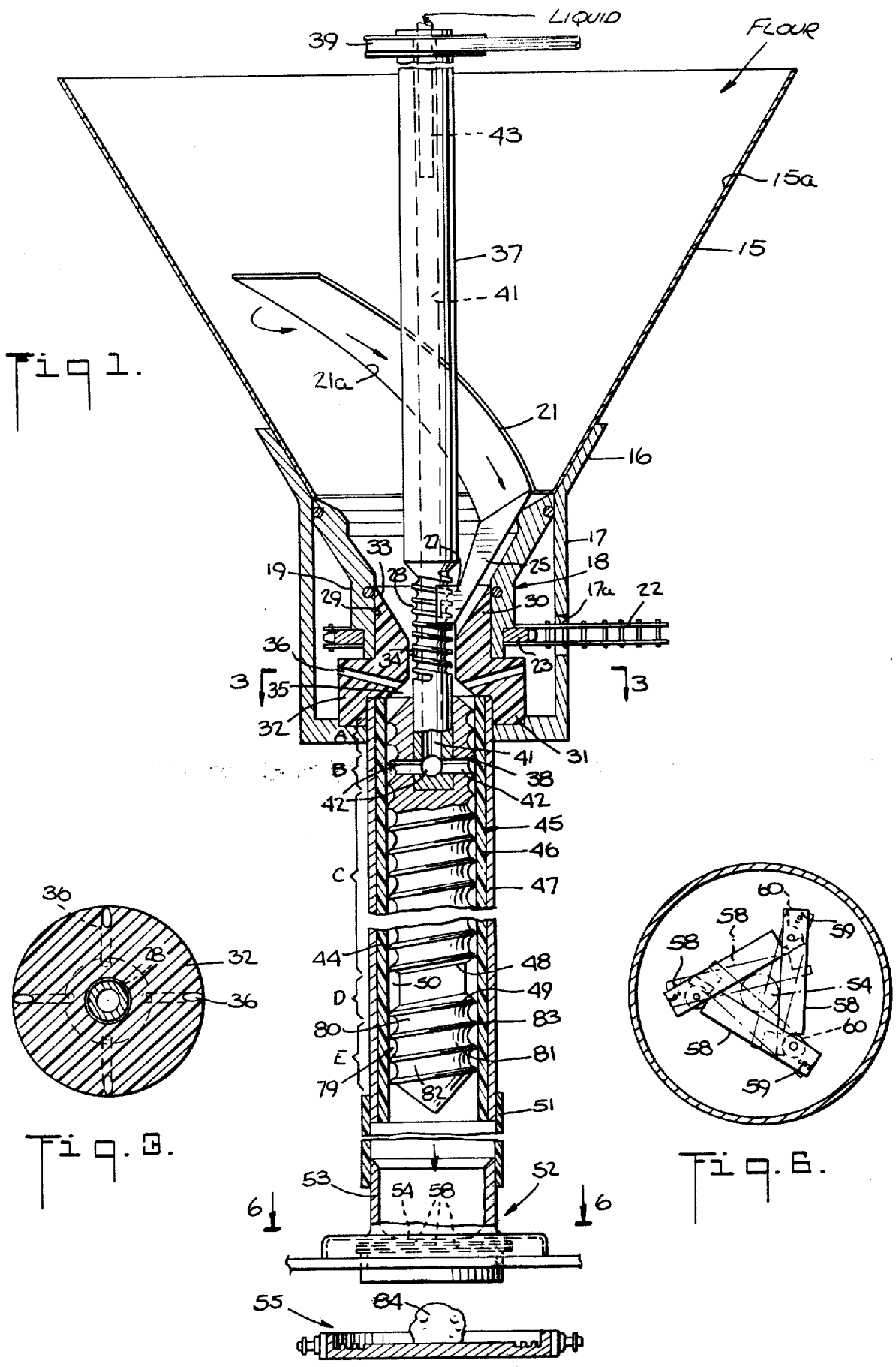

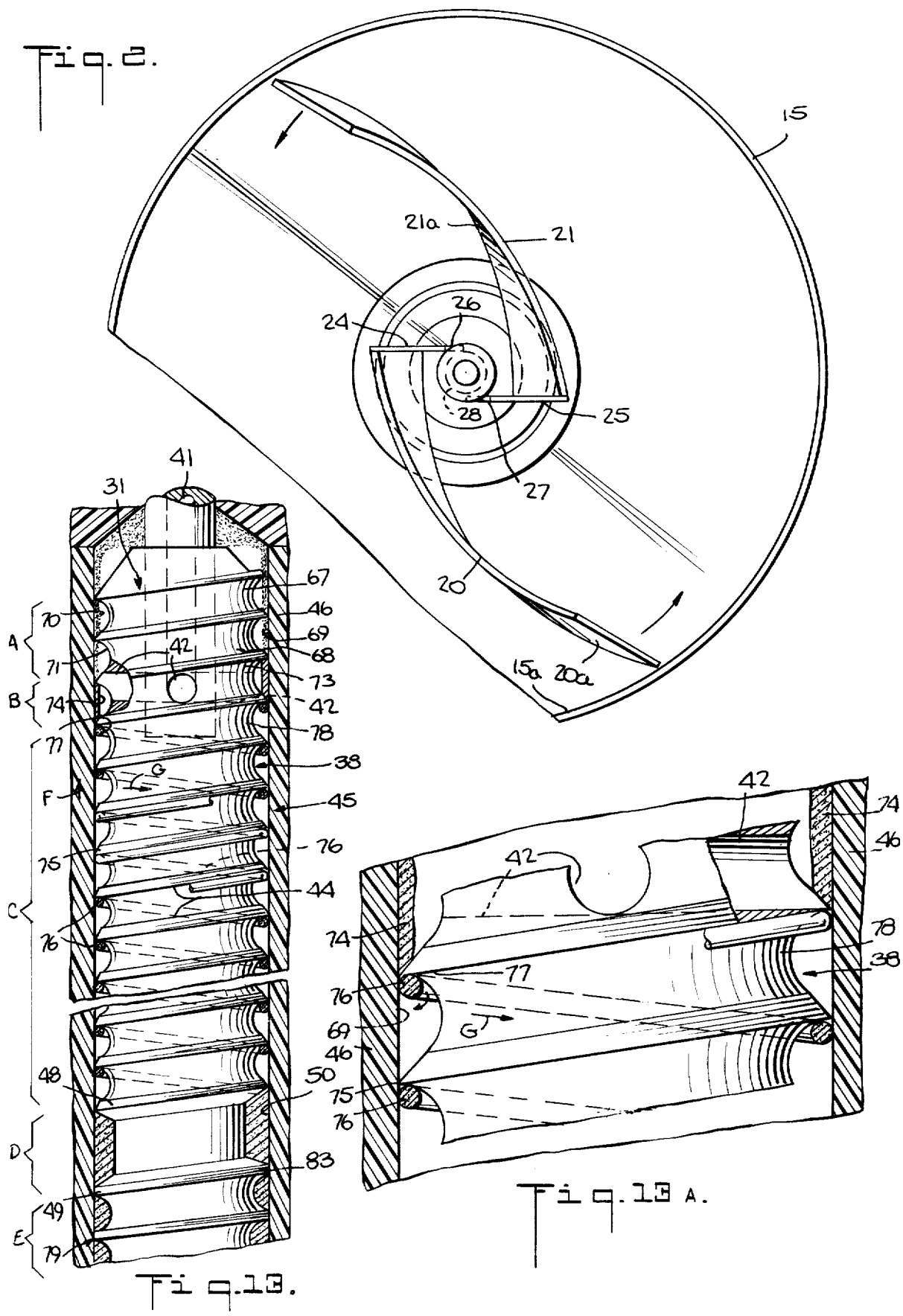

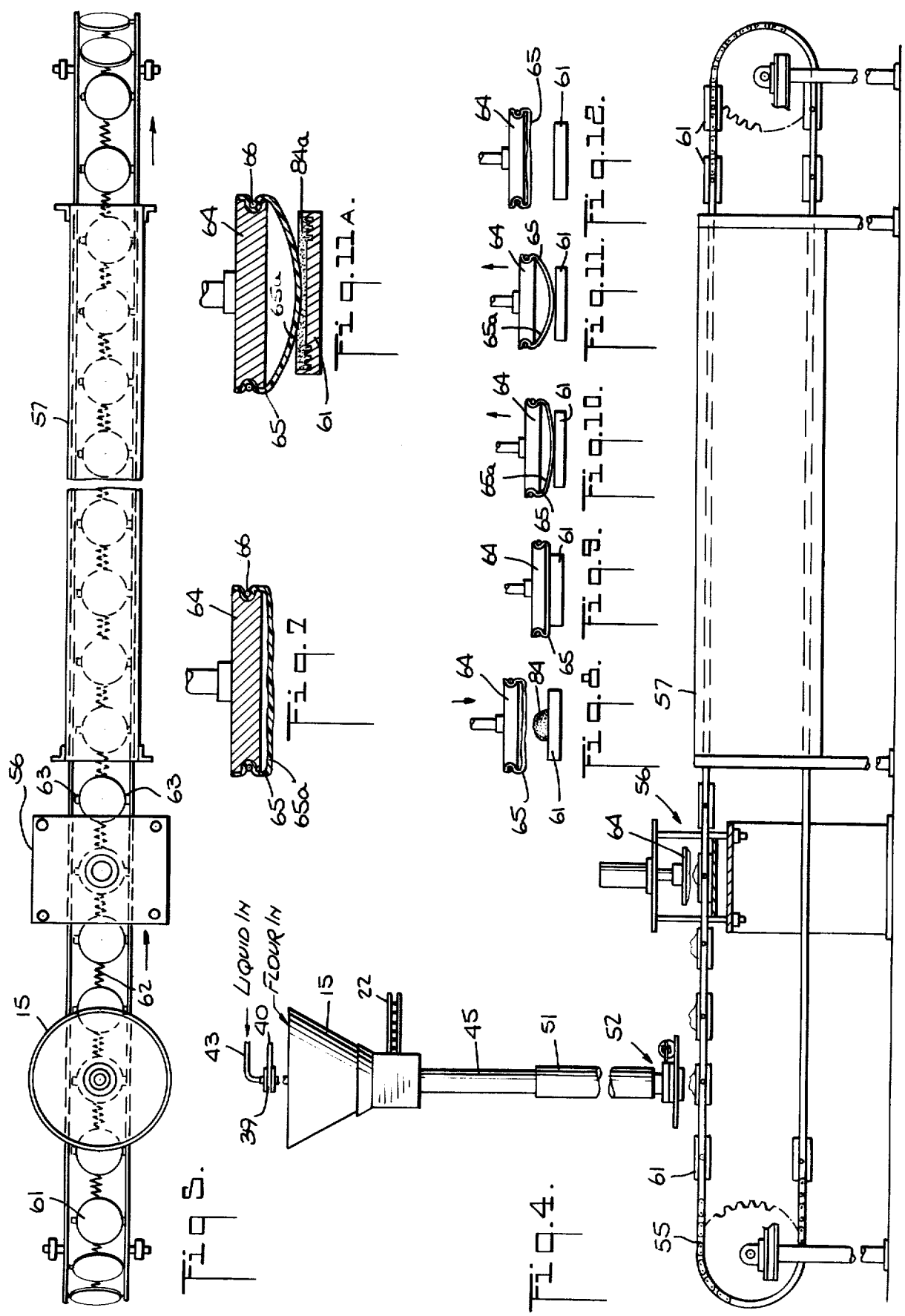

METHOD AND APPARATUS FOR PROCESSING DOUGH

BACKGROUND OF THE INVENTION

This invention relates to a method and apparatus for processing dough for such products as bread, pizza and other bakery products.

In the conventional methods of processing dough, a number of steps are separately performed by manual or mechanical means, the manual operations and the interruptions between the various intermittent steps making the process timeconsuming and costly. It has also been found that both the conventional manual and mechanical methods of mixing the flour and liquid ingredients frequently produce non-homogeneous masses of dough, and result in non-uniform dough balls and a final product of unpredictable consistency.

Where the process includes the formation of the dough balls into units of predetermined size and configuration by the use of conventional stamping or forming dies to press each dough ball into an underlying mold, both the mold and the dough therein tend to stick to the die due to the vacuum created between the coacting members during the pressing action—resulting in a messy die and in considerable resistance to the operative separation of the die from the mold.

SUMMARY OF INVENTION

It is the main object of this invention to provide a method and apparatus of processing dough for bakery products that is continuous in operation, that is automatic from the initial steps of feeding the flour and the required working solution into the machine to the final steps of forming units of the fully processed dough ready for baking—without any of the aforesaid disadvantages and shortcomings.

More particularly, it is an object of the invention to effect successive processing steps operating at an exceedingly high speed to produce finished products at a rate far in excess of that possible by the use of known methods and apparatus. It is a further important objective to effect a more complete and intimate mixing of the liquid and flour ingredients so as to produce a thoroughly homogeneous mass of dough, thereby assuring final products of uniform size and quality. Other objects are to provide dough cutting and shaping means adapted for high-speed production and with the aforesaid disadvantages of vacuum-induced sticking between the die and dough-filled mold eliminated.

It is a further object of the invention to provide a relatively simple and economical dough-producing apparatus and method having all the features and advantages hereinabove set forth.

Briefly stated, in practicing the preferred method of this invention, flour is first thoroughly agitated and churned to produce a finely powdered mass which is then conveyed to a film-forming region and centrifugally hurled against the internal surface of a vertically disposed cylindrical wall, thereby forming a thin downwardly moving cylindrical film of the finely pulverized flour. A suitable working solution is thereafter contrifugally hurled against said film of flour, the flour and solution becoming intimately admixed and being formed into a downwardly moving film of the mixture. This film is then scraped downwardly along said surface to form a round ribbon of elongated helical configuration, the ribbon being mechanically manipulated in a manner to produce a kneading effect, and at the same time urged downwardly and then accumulated into an enlarged mass of homogeneous dough. Portions of this mass are then continuously extruded and fed towards a cutting station where sections of the dough are cut off and dropped in the form of dough balls into successively advanced molds which are then conveyed to a forming station at which the dough balls are formed into predetermined shapes preparatory to being fed into a baking oven.

A preferred apparatus for performing the steps of the process above described employs a hopper for receiving the flour and a rotary agitator with vanes for churning the flour and directing it to a feeder screw which in turn guides and directs the powdered flour towards a centrifugal mixer screw, both screws being operated at extremely high speeds. The said centrifugal mixer screw is positioned within a tubular mixing chamber, and has a helical thread forming a plurality of flights, the upper flights receiving the powdered flour from the hopper. During the spinning action of the latter screw the flour is centrifugally hurled against the inner wall of said tubular mixing chamber to form the downwardly moving film. Said mixer screw has ducts therein which receive the said working solution from suitable pumping means and through which, in the manner aforesaid, the solution is hurled towards said inner wall and into intimate contact with said flour film. The peripheral thread portions of the flights are proportioned and positioned to scrape the composite flour and liquid film downwardly, producing the aforesaid round ribbon, the peripheral portions of the screw engaging and, in effect, kneading the said ribbon of dough material. The screw also has an enlarged region for receiving and accumulating the formed dough; and the very bottom of the screw has a plurality of helical flights which serve as means to extrude the accumulated dough and force it down a proofing tube to a multi-bladed scaling knife which forms dough balls in rapid succession.

An underlying conveyor carries molds under the cutting station to receive said dough balls which are then conveyed to a forming station having a novel forming die. The underside of the die is provided with a loose membrane which separates the die proper from the dough-carrying mold when the die is brought into pressing position. When the die is operatively raised, the loose diaphragm gradually separates from the dough-carrying mold, thereby preventing the vacuum-caused adhesion of the mold and dough to the die.

OUTLINE OF DRAWINGS

For a better understanding of the invention as well as other objects and features thereof, reference is made to the annexed drawings wherein:

FIG. 1 is a vertical section, partly in elevation, of a preferred form of apparatus of this invention;

FIG. 2 is a fragmentary top plan view of FIG. 1, portions being removed for clarity;

FIG. 3 is a section of FIG. 1 taken along line 3—3;

FIG. 4 is an elevational view, partly in section, of said apparatus for carrying out the various steps of the process;

FIG. 5 is a top plan view of FIG. 4;

FIG. 6 is a fragmentary section of FIG. 1 taken along line 6—6, the broken lines indicating the projected positions of the blades;

FIG. 7 is a vertical section of the forming die used in this invention;

FIGS. 8 to 12 are a series of elevational views of the forming die and a dough-carrying mold showing several successive positions of the die;

FIG. 11a is a somewhat enlarged vertical section of FIG. 11;

FIG. 13 is an enlarged fragmentary portion of FIG. 1, showing the various processing sections, and semischematically indicating the material as it is being processed; and FIG. 13a is an enlarged representation of a portion of the apparatus shown in FIG. 13.

DESCRIPTION OF INVENTION

In the preferred method of practicing this invention by the apparatus illustrated in the drawings, a conical feeding hopper 15, suitably supported by the flared upper portion 16 of the housing 17, communicates with rotary flour agitating means, generally designated 18, disposed within said housing and comprising a funnel-like casing 19 and a pair of diametrically opposite vanes 20 and 21 carried by the internal wall of said casing and extending upwardly into said hopper. In the particular embodiment shown in the drawings, said vanes are of semi-helical configuration disposed in angular relation—preferably though not necessarily normal—to the inner surface 15a of said hopper 15, the respective outer edges 20a and 21a being in close proximity to said inner surface, said vanes being arranged to direct flour operatively disposed within said hopper downwardly for processing in a manner to be hereinafter described. Said casing 18 is rotatable about a vertical axis, being driven by a motor (not shown) connected to chain 22 in operative engagement with the sprocket ring 23 on the outer surface of said casing, said chain passing through the aperture 17a in said housing 17. Extending downwardly and inwardly from the lower ends of said vanes 20 and 21 are the two deflector portions 24 and 25, respectively, the respective lowermost portions 26 and 27 being in vertical planes and in spaced parallel relation and flanking the feeder screw 28 to be hereinbelow described, said portions 26 and 27 serving as guide blades for directing the flour into operative engagement with said feeder screw whereby said flour will be operatively fed downwardly for processing.

Extending upwardly into the throat 29 of said casing 19 is the body portion 30 of the flanged gland 31 preferably made of relatively soft non-ferrous material such as "Teflon" tetrafluoroethylene; and in underlying engagement with said casing is the flange 32 of said gland. Said gland has an internal passageway comprised of an upper conical portion 33, an intermediate cylindrical portion 34, and a lower downwardly and outwardly flared chamber 35, the latter communicating through a plurality of air vent channels 36 in said flange with the atmosphere.

The said feeder screw 28 is carried by the vertical shaft 37 extending axially through said funnel 15 and casing 19, said feeder screw extending downwardly through and in coactive relation with said intermediate passageway portion 34 of said gland and joined, by suitable securing means known to those skilled in the art, to the centrifugal mixer screw 38. In the preferred form illustrated, said guide blades 26 and 27 are disposed in said upper conical passageway portion 33 of said gland 32. The said vertical shaft 37 carries at an upper portion thereof the pulley 39, the coactive belt 40 being connected to a motor (not shown) adapted to drive said shaft at an extremely high speed—such as, but not limited to, 3,000 to 4000 r.p.m., so as to impart corresponding high speeds 4,000 said feeder screw 28 and said centrifugal mixer screw 38, thereby to provide the centrifugal action required by this invention to effect the desired admixing and development steps.

Extending through said vertical shaft 37, the feeder screw 28 and the upper portion of said centrifugal mixer screw 38 is the longitudinal channel 41, the lower portion of which communicates with a plurality of ducts 42 extending transversely through the said screw 38 and being open at their respective outer ends. Disposed within the upper portion of said longitudinal channel 41 and extending outwardly therefrom is the pipe 43 through which a suitable working solution is pumped, the pumping means not being shown, being well known to those skilled in the art.

The said centrifugal mixer screw 38 is of greater diameter than said feeder screw 28 and has a helical thread, generally designated 44, serving the dual function of a ribbon conveyor comprising a plurality of flights and a centrifugal mixing device, all as will more clearly hereinafter appear. Said mixer screw 38 is housed within the vertical tubular mixing and developing chamber generally designated 45. In the preferred constuction, said chamber has an inner lining 46 made of suitable soft material such as "Teflon" encased by an outer tubular member 47 of structurally strong rust-resisting material such as stainless steel.

The said chamber 45 has a plurality of processing sections, to wit, a film-forming section A, an atomizing section B, a kneading and development section C, an accumulation section D and a pumping or extruding section E.

The number of flights for each section may vary under different operating conditions, the drawings, for illustrative purposes, showing two flights for section A, one flight for section B, a relatively large number of flights for section C, and three flights for section E. In section D there is a relatively wide space between the respective upper and lower thread portions 48 and 49, thereby providing an enlarged accumulation compartment 50. It is also noteworthy that the entire helical thread extending through sections A, B and C has a sharp edge portion, whereas the helical thread in section E presents a substantially flat surface to the surrounding surface of the lining 46, for reasons which will appear from the description hereinafter given.

The said tubular chamber 45 extends into the vertically disposed proofing tube 51 through which the processed dough leaving the chamber 45 flows downwardly to the cutting station generally designated 52, said latter station having a housing 53 with a passageway 54 transversely intercepted by rapid dough cutting means for severing the downwardly moving mass of dough into dough balls for deposit upon the conveyor 55, illustrated as an endless chain conveyor. The said conveyor carries successively formed dough balls to the forming station, generally designated 56, for producing dough units of predetermined size and shape, the conveyor then carrying the properly formed dough units to oven 57 after which the operatively baked pieces are brought to a discharge station not shown.

Various cutting devices may be employed at station 52 within the scope of this invention. The particular scaling knife device illustrated consists of an arrangement of three thin, horizontally disposed overlapping blades 58 each having one end thereof mounted at adjustable pivot means 59 and engaged at the opposite end by an actuator 60, whereby the blades are swung inwardly in intercepting relation to the said passageway 54, thereby cutting the dough in the path of the blades transversely. The motor means for operatively moving said actuators 60 and the blade retracting means are not herein described, since a description thereof is not necessary for an understanding of this invention.

The particular embodiment of dough forming means constituting an aspect of this invention is illustrated in FIGS. 7 to 12. The die member 64 supports a thin relatively loosely mounted membrane 65, the membrane being attached at regions 66 of the die's sides, the portion 65a underlying the die being sufficiently loose to be separable therefrom when the die is being operatively retracted while still in engagement with the sticky dough, thereby to effect a gradual detachment of the die from the mold and dough, all in the manner more fully hereinafter set forth.

In the operation of the particular apparatus illustrated, flour is fed into said hopper 15, and a suitable working dough forming solution, sometimes referred to as a yeast solution, is pumped through said pipe 43 into said channel 41. The operative high-speed rotation of the casing 19 causes a thorough agitation and churning of the flour engaged by said vanes 20 and 21, producing a finely powdered mass. The configuration of said vanes is such as to urge the agitated mass to move inwardly toward the said vertical shaft 37, the said deflector blades 26 and 27 directing the flour into intimate engagement with the said feeder screw 28 which extends through said flanged gland 31. The direction of the feeder screw thread is such that the flour is fed downwardly through the axial passageway 34 into the conical chamber 35—the said vent channels 36 being air ducts and preventing pressure effects that might interfere with the downward flow of the flour, chamber 35 being the flour discharge outlet.

The finely divided flour is operatively received by the upper flight 67 of the said centrifugal mixer screw 38, and due to the combined action of gravity and the crowding action of the flights is directed downwardly into the said film-forming section A of the said mixing and developing chamber 45, said section A, in the particular embodiment illustrated, comprising the flights 67 and 68. Due to the aforesaid extremely high speed of rotation of the screw 38, the finely divided flour particles are centrifugally hurled outwardly against the inner surface 69 of the inner tubular lining 46 forming a thin cylindrical downwardly moving film 70 of flour particles in said section A. Any flour particles coming into contact with the surface 71 of said flights 67 and 68 will be instantly thrown outwardly at high speeds to bombard and admix with the said film 70, thereby producing a film of evenly distributed flour material.

Since the said ducts 42, receiving the working solution from said channel 41, are located in flight 73 of said screw 38—within the said atomizing section B—the liquid discharged from said ducts will, in the manner aforesaid, be centrifugally hurled outwardly towards said inner surface 69 of the lining member 46 to become atomized and admixed with the cylindrical film 70 of flour moving downwardly therealong. The high-speed liquid particles bombarding the film become intimately admixed therewith, producing a pasty mass of homogeneous composition moving downwardly substantially in the form of the film indicated by the reference numeral 74.

The said film 74, being no longer in the powdered form of film 71, is now in condition to be mechanically worked into a dough. This is effected within the said kneading and development section C wherein the outer peripheries of the flights engaging the moist mass form it into a ribbon of substantially circular cross-section extending downwardly around said screw 38 in helical configuration. As aforesaid, the helical thread 44 defining the respective flights on screw 38 present sharp edges 75 to the inner surface of said lining member 46 in section C, thereby in effect scraping the moist mass downwardly and forming it into said elongated round ribbon substantially like that indicated by the reference numeral 76 (FIG. 13). Since the said ribbon is positioned between and engaged by said surface 69 and the upper region 77 of the flight 78, the round ribbon is operatively curled and rotated in the direction of arrow F as it is being scraped downwardly, and is also being urged slopingly downwardly along a helical path, substantially in the direction of arrow G, due to the operative rotation of said screw 38. It has been found that this compound action is akin to a kneading action as the ribbon of dough is traveling down and operatively developing into a final homogeneous mass along the extent of said section C. It is to be noted that the number of flights in section C can vary from one to many, depending upon the development time and the amount of kneading required for the particular ingredients used and under the particular prevailing conditions.

The ribbon of dough leaving section C enters the said accumulation section D; and since this in effect is an enlarged chamber, the said ribbon will be deposited therein as a mass of dough. The said extruding section E comprised of the lower portion 79 of the screw 38, with flights 80, 81 and 82 defined by a helical thread presenting a flat edge 83 to the inner surface of the inner lining 46, is in effect a pumping or extruding section, receiving the dough from the accumulation compartment 50 and discharging it into the said proofing tube 51. The said latter tube serves as a passageway for the dough to the scaling knife and allows sufficient proofing of the dough under constant pressure. Since the dough formed by the process above described is homogeneous and of uniform density, accurate scaling by the cutting means at said station 52 can be effected by suitable cutting means, such as the triple blade device 58 above-described.

It has been found that using the method and apparatus above described, with a screw speed of about 3,500 r.p.m., the downward movement of the material being processed within the tubular chamber 45 is at the rate of one-sixtieth of a second for each flight of screw 38. The rate of producing thoroughly mixed and homogeneous dough ready for scaling is thus far in excess of that possible with known dough forming devices.

The dough in the form of balls 84 from the scaling station 52 is deposited on the successive molds 61 operatively carried by said conveyor 55 to a position underneath the said scaling station; and from there the balls are conveyed to the said forming station 56 to be formed by the die 64 into the finally shaped pieces 84a (FIG. 11a).

In the operation of the above-described die member 64, the die is first operatively actuated downwardly towards the dough-carrying mold 61 (FIGS. 8 and 9), whereafter the die is raised to separate it from the mold and formed dough (FIGS. 10–12). When the die is in operative engagement with the dough and mold, said membrane portion 65a will be pressed between the forming surface 64a of the die, the dough ball 84 and the upper peripheral surface of the mold. Upon the operative upward releasing movement of the die, the free and relatively loose central portion of the membrane portion 65a will initially adhere to the said peripheral mold surface and the top of the compressed dough. As the die is operatively retracted upwardly, said loose membrane portion 65a will be gradually separated from the underlying mold and dough. The separating process continues until said membrane portion becomes completely detached from the dough. Such gradual detachment results in a gradual breaking of any existing vacuum grip, thereby obviating the unwanted adhesion to the die of the mold and dough such as occurs when there is no separable membrane element between the two coacting components of the molding apparatus. It has been found that this novel form of die with a loose membrane does not in the slightest interfere with its desired dough-shaping action, and further that it reduces the separating effort of the die from the mold.

In the above description, the invention has been disclosed merely by way of example and in preferred manner; but obviously many variations and modifications may be made therein. It is to be understood, therefore, that the invention is not limited to any form or manner of practicing same, except insofar as such limitations are specified in the appended claims.

I claim:

1. In a method of processing dough from flour and a dough-forming solution, the steps of providing a vertical tubular chamber, feeding the flour into said chamber and centrifugally hurling it against the inner wall of the chamber thereby depositing the flour in a thin film upon the inner wall of the chamber, feeding said solution into said chamber and centrifugally hurling it against the thin film of flour thereby intimately admixing it with said film to form a pasty film on said inner wall, directing said pasty film downwardly along said inner wall along a helical path, scraping said pasty film from said inner wall to form a downwardly extending helical ribbon, and subjecting said ribbon to a kneading action as the ribbon travels downwardly.

2. In a method of processing dough, the steps according to claim 1, said scraping step including the simultaneous curling of said helical ribbon and holding it in slidable engagement with said inner wall to effect said kneading action.

3. The method of claim 1 further comprising the step of depositing said ribbon in the form of an accumulated mass within a section of said chamber.

4. In a method of processing dough, the steps according to claim 3, said solution-admixing step occurring after and at a level below that of the occurrence of said flour-depositing step, said scraping step occurring after and at a level below that of said solution-admixing step, whereby said films are permitted to move gravitationally along said wall from the uppermost to the lowermost of said levels.

5. In a method of processing dough, the steps according to claim 3, said subsequent processing including the step of extruding and directing said accumulated mass toward a path leading to a predetermined dough-cutting station.

6. In an apparatus for processing dough from flour and a dough-forming solution, a vertical tubular chamber, centrifugal means positioned within said chamber and rotatable about a vertical axis, flour and liquid feeding means operatively connected with said centrifugal means for directing said flour and solution into said centrifugal means, and means to operatively rotate said centrifugal means, whereby said flour and solution will be hurled against the inner surface of said chamber to form thin cylindrical films of said material on said inner surface in an upper film-forming section of said chamber, said centrifugal means including means for scraping the formed-film off the inner surface of the chamber to form the film into a helical ribbon and kneading same in a kneading and developing section in a lower portion of said chamber.

7. In an apparatus for processing dough, the combination according to claim 6, said feeding means comprising separate flour feeding and solution feeding means, discharge outlets in said respective feeding means operatively connected with said centrifugal means, the discharge outlet of said flour feeding means being at a level above that of said solution feeding means.

8. In an apparatus for processing dough, the combination according to claim 7, said centrifugal means comprising a screw member disposed vertically within said tubular chamber and having a plurality of peripheral helical flights with peripheral thread portions in close proximity to the inner surface of said chamber.

9. In an apparatus for processing dough, the combination according to claim 8, said chamber having an atomizing section interposed between said upper film-forming section, and said developing section, said screw member extending along the extent of said sections, said discharge outlet of said feeding means being positioned adjacent the upper portion of said film-forming section, said discharge outlet of said solution feeding means being adjacent and communicating with said atomizing section and above said kneading and developing section.

10. In an apparatus for processing dough, the combination according to claim 9, said chamber having below said kneading and developing section an accumulation section and therebelow an extruding section, said screw member extending along the extent of said latter two sections, said accumulation section being of greater height than the vertical distance between any two adjacent flights of said screw member, whereby an enlarged accumulation compartment is formed at said accumulation section, said screw member having in the region of said extruding section a plurality of peripheral helical flights with peripheral thread portions in close proximity to the surrounding inner surface of said chamber.

11. In an apparatus for processing dough, the combination according to claim 10, the helical thread portions of the flights in said film-forming, atomizing and kneading and developing sections presenting substantially sharp edges to the surrounding inner surface of said chamber, and the helical thread portions of the flights in said extruding section presenting substantially flat edges to the surrounding inner surface of said chamber.

12. In an apparatus for processing dough, the combination according to claim 8, said solution feeding means comprising a channel extending longitudinally within said screw member and operatively connected at the upper portion thereof with a source of supply of said solution, and a plurality of ducts communicating with the lower portion of said channel and extending transversely through said screw member, said ducts open at the outer ends, whereby upon the operative rotation of said screw member portions of the said solution will be discharged in the direction of the surrounding surface of said chamber.

13. In the apparatus for processing dough, the combination according to claim 8, said flour feeding means comprising a feeder screw positioned above and in axial alignment with said centrifugal screw member, the diameter of said feeder screw being less than that of said centrifugal screw member, and conical flour feeding means having a lower throat portion through which said feeder screw extends, said throat portion communicating with said flour discharge outlet.

14. In an apparatus for processing dough, the combination according to claim 13, said feeder screw being connected to said centrifugal screw member, and single driving means for said feeder screw and screw member whereby they rotate together and at the same speed.

15. In an apparatus for processing dough, the combination according to claim 13, said conical flour feeding means comprising a hopper, a rotatable funnellike casing below and communicating with said hopper, means to rotate said casing, and vanes attached to and rotatable with said casing, said vanes having upwardly extending portions disposed in angular and proximate relation to the wall of said hopper, said vanes having downwardly extending deflector portions adjacent said feeder screw for directing the flour into operative engagement with the threads of said feeder screw.

16. In an apparatus for processing dough, the combination according to claim 13, said flour discharge outlet being in communication with the atmosphere.

* * * * *